United States Patent [19]

Paulson et al.

[11] 4,174,937
[45] Nov. 20, 1979

[54] POWDER AGGLOMERATOR AND ITS METHOD OF USE

[75] Inventors: Danton L. Paulson; Robert B. Worthington, both of Albany, Oreg.

[73] Assignee: The United States of America as represented by the Secretary of the Interior, Washington, D.C.

[21] Appl. No.: 942,834

[22] Filed: Sep. 15, 1978

Related U.S. Application Data

[62] Division of Ser. No. 559,936, Mar. 19, 1975.

[51] Int. Cl.² .............................................. B22F 3/00
[52] U.S. Cl. ................................................... 425/222
[58] Field of Search .......................... 425/222; 264/117

[56] References Cited

U.S. PATENT DOCUMENTS

| | | | |
|---|---|---|---|
| 3,206,528 | 9/1965 | Coombs et al. | 264/114 |
| 3,555,133 | 1/1971 | Gentaz | 264/117 |

*Primary Examiner*—Robert F. White
*Assistant Examiner*—James R. Hall
*Attorney, Agent, or Firm*—Thomas Zack; Donald A. Gardiner

[57] ABSTRACT

A powder agglomerator and its method of use. The invention is used to take extremely fine flue dust particles in a collection bin and process them before sending the resultant agglomeration to storage or a further processing location. From its collection bin, the dust particles are discharged by gravity upon a lower rapidly rotating smooth horizontal disc. The bin discharge is offset slightly from the disc's center so that the particles are subjected to centrifugal force to move them to the disc's outer periphery. At the point where the particles are discharged on the disc, a liquid binder, like water, is sprayed on the particles to cause them to begin to agglomerate. After being sprayed, the wetted particles are agglomerated under the influence of centrifugal and tangential forces. When they reach the disc's raised edge, the particles are completely agglomerated at which time they fall over the edge into a discharge hopper located below. Except for its slightly raised peripheral edge, the horizontal disc surface is almost perfectly smooth. The disc's shape including its slightly raised peripheral edge insure a short residence time for the wetted particles before they are agglomerated and discharged.

4 Claims, 3 Drawing Figures

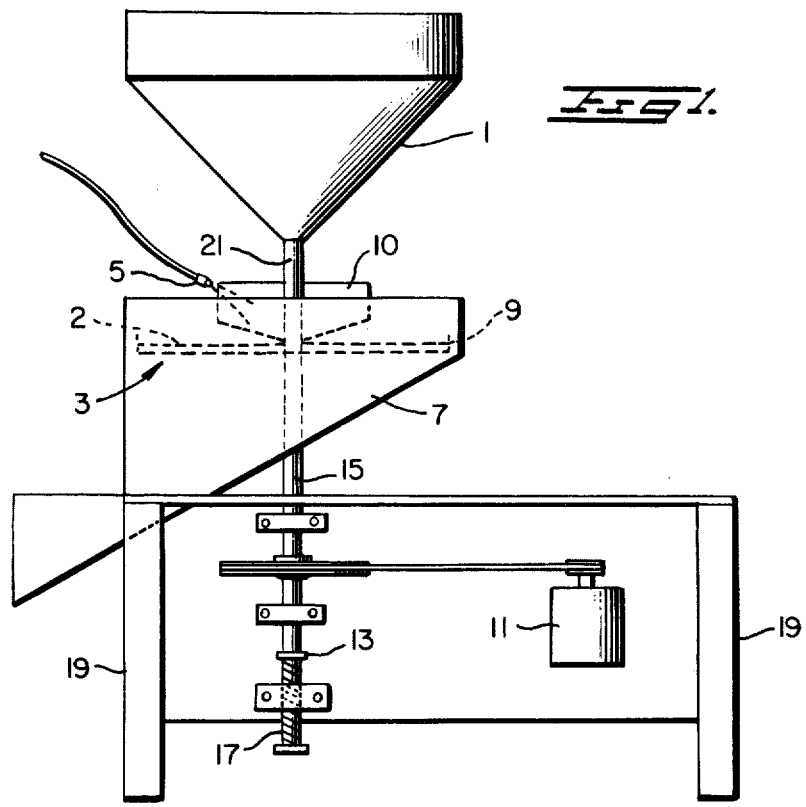
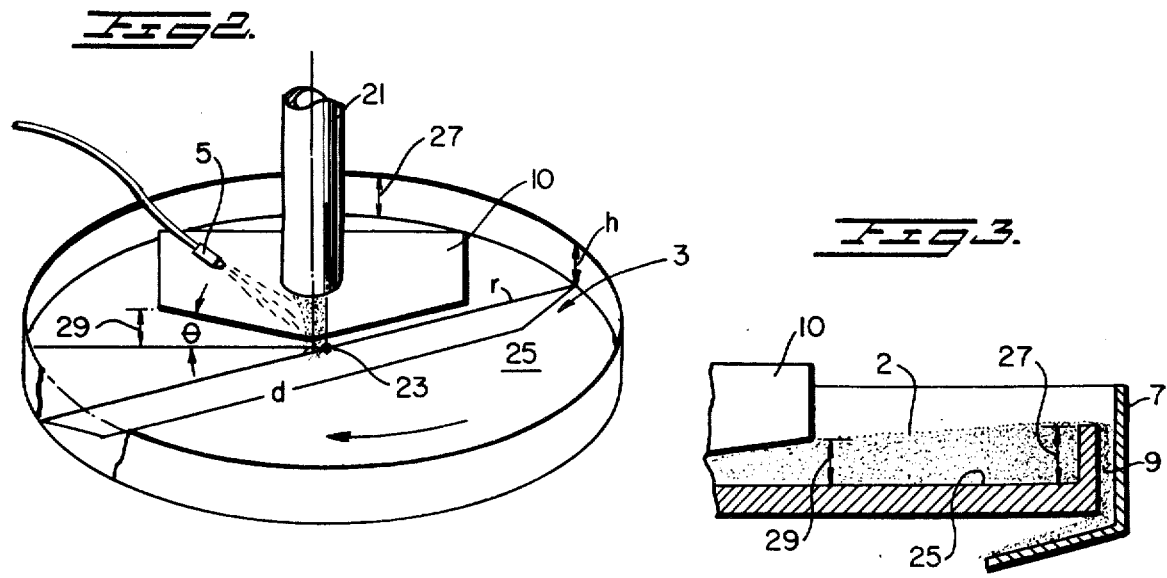

POWDER AGGLOMERATOR AND ITS METHOD OF USE

This is a division of application Ser. No. 559,936, filed on Mar. 19, 1975.

BACKGROUND OF THE INVENTION

1. Field of the Invention

The invention described in this specification relates to a powder agglomerator for use with extremely fine dust particles.

2. Description of the Prior Art

The deposition of powdered materials upon a rotating surface at the same time a spray of water is being applied is old in the art as evidenced by the two U.S. Pat. Nos. 2,860,598 and 3,206,528 to Ernst G. Loesche and J. A. Combs et al., respectively. These patents describe pelletizing devices which produce relatively larger spheres than our agglomerator and provide for longer retention times for a given level of material processing per unit time. Basically, our invention is an improvement over such pelletizers and their methods of use in which extremely fine particles are involved i.e., those particles having diameters under 0.01 of an inch and usually in the 0.006 inch range. When such fine particles are involved in large quantities rather than just expel them to the ambient atmosphere, as occured before the advent of efficient pollution abatement systems, it is desirable to transport them at minimum cost to different locations for disposal or further processing. In transporting these fine particles to a new location conventional material handling techniques have not proven satisfactory because of the physical nature and size of many particles. For example, if a tubular conduit with an air stream is used as the transporting medium in a mass operation, many particles in large quantities will act like fibrous materials and adhere to the tubular walls and themselves to clog the conveyor. To prevent this from happening it has been suggested that agglomerating the particles to transport them is preferable. However, the prior art revealed no inexpensive and efficient method and apparatus to accomplish the desired agglomeration of extremely fine particles on a mass basis. Our invention seeks to overcome these deficiencies as set forth hereinafter.

SUMMARY

The method and apparatus of our invention is directed to agglomerating extremely fine particles that are (0.01 of an inch in diameter) in about the 50 mesh or smaller range. It accomplishes this objective by discharging the particles slightly off center on a generally smooth horizontal rapidly rotating disc with a slightly raised peripheral edge. The velocity of the edge is kept substantially constant during the agglomeration process. Near where the particles meet the rotating disc a fine spray of a binder solution is applied. Centrifugal and tangential forces caused by the rotation of the disc, move the wetted particles over the disc's surface until they engage its raised outer edge. At the edge the particles become slightly backed up until their total momentum is sufficient to cause them to move over the edge and off the disc and into an underlying discharge hopper.

The primary object of this invention is an improved method and apparatus for agglomerating extremely fine particles.

BRIEF DESCRIPTION OF THE DRAWINGS

FIG. 1 is a diagram of the system set up of our invention.

FIG. 2 is an enlarged view of the rotating disc where it meets the collection bin discharge outlet.

FIG. 3 is an enlarged view of the disc's edge.

The collection bin 1 initially receives the extremely fine particles 2 from some type of processing equipment. These particles may be the fine electrostatic precipitator and baghouse dusts from a highly efficient pollution abatement system. They may also be metallurgical flue dusts of a reverberatory flue or electrostatic precipitator system from an ore processing system. Whatever their specific source, the fine particles our invention is directed to are in the Tyler Screen Sizes having a 50 to 200 mesh range size i.e., diameters ranging from about 0.01 of an inch to about 0.0029 of an inch. Because of their small size and unit weight plus their physical make up, there is a tendency for many of these fibrous like particles to float off moving conveyors and to adhere to themselves and materials they contact. In some cases their angle of repose can be as much as 90 degrees from the horizontal. To prevent this tendency from occuring, we have tried to make these particles take on the flow characteristics of a liquid for easy in handling.

Achievement of our objective is obtained by letting the particles fall upon a rapidly rotating circular disc 3 simultaneously with the spraying of a fine mist binder solution from spray nozzle 5. After the wetted particles are discharged on the disc surface they move towards the periphery of the disc under the imparted centrifugal force until they encounter a slightly raised outer edge. Thereafter, after a sufficient build-up takes place, the particles "flow" over the edge and into the discharge hopper 7 by way of the area 9 between the disc's edge and the hopper's sides. A stationary pentagon shaped scrapper unit 10 with sloping edges that join at the disc surface is fixed to discharge conduit 21. These lower sloped edges guide the particles to insure that the particles assume a gradual slope starting near the disc's center. In cross-section when an equilibrium condition is reached, the configuration of the deposited particles can be described as concave or as an upwardly opening hyperbola with little or no particles remaining near the disc surface under the discharge conduit end.

Rotation to the disc is imparted by a variable speed electric motor 11 suitably connected by a conventional chain or belt drive and thrust bearing 13 to rotatable shaft 15. This shaft is rigidly connected to the underside of disc 9 so that its rotation imparts rotation thereto. A threaded section 17 between two stops on the shaft may also be provided to control the feed rate of the particles by varying the vertical distance between the disc and the collection bin's discharge outlet. The discharging of the particles upon the rotating disc and their subsequent movement thereon is better illustrated in FIG. 2. Discharge outlet 21 deposits its particles under the influence of gravity and is slightly (about an inch) offset from the disc center 23. This type of arrangement insures the requisite imparting of the centrifugal force to the particles rather than have them pile up at the disc's center. Scrapper 10 aids in pushing the particles towards the edge 27 so that they are subject to centrifugal forces of sufficient strength to propel them off the disc. Once on the flat horizontal surface 25 of steel disc 3 the particles rapidly move towards the slightly raised outer peripheral edge 27 of the disc. The actual average residence time of any one particle on the disc's surface is generally less than one complete disc revolution. The height of the particles build up at the edge 27, at equilibrium, is greater than the edge thereby causing a flow into area 9 and the hopper 7. This type of set up allows the particles to further agglomerate together so that their characteristic movement over the edge approaches the "flow" of a steady stream of liquid when a mass operation takes place.

In our best test run to date the operating parameters of our invention were as follows: the binder solution was water that added 8.5 to 10 percent by weight to the fine reverberatory furnace flue dust particles; the rotation speed of the disc was 120 revolutions per minute (RPM); and the feed rate from discharge (21) was 2.6 pounds (1,180.3 grams) of particles per minute. The dimensions of the equipment were as follows: the diameter of tube outlet 21 was 1 inch; the disc's diameter was 13.5 inches; the disc's raised edge 27 was 1 inch; the largest diameter of the discharge hopper (7) was 16.25 inches; and the largest diameter of the collection bin (1) was 18 inches. The scrapper (10) was made of a flat sheet of metal that was 7 inches long at its upper horizontal edge. The vertical distance 29 between the highest sloped portion of the edge (see FIG. 2) and its underlying flat disc surface was ½ inch. To accomplish the gradual slope built up of dispensed particles so that they do not fly off the disc's edge, it is essential that the distance 29 always be less than the vertical heights of peripheral edge 27.

It should be apparent from the foregoing description that we have achieved our objective of a low cost method and apparatus which can process mass quantities of extremely fine particles into agglomerated particles which if the circumstances permit, may then be recycled. For example, reverberatory furnace dusts from a copper smelting operation gave been recycled after agglomeration to yield high concentrations of copper matte and copper metal. However, even if there is no contemplated recycling of the dust particles, our agglomeration process and apparatus can be very useful in preparing the particles for transporting without being fluidized and falling off of a moving belt or other type of conveyor or adhering to the transporting system. One additional consideration that our invention was directed towards was compliance with OSHA (Occupational Safety and Health Administration) Standards for handling such fine dust particles.

Besides the previously mentioned best test results other succesful tests were conducted with the disk rotating at 86 RPM's; the distance between the outlet of conduit 21 and the disc being ⅛ of an inch; the binder (water) spray weight percentile being 5.7; the moisture content of the agglomerated particles being 2.8 percent of their weight; and the particle feed rate being 1726 and 1736 grams per minute to the disc. To scale up the dimensions and operating characteristics from our best test run (120 RPM, 13.5 wheel dia., etc.) two operating parameters have been used. The first is that the angle $\theta$ formed by the lower sloped edge of scrapper 10 (see FIG. 3) is constant and equal to h, the height of the disc's edge 27, divided by r, the disc's radius. The second is that the edge velocity of the disc is kept constant and is equal to the disc's RPM times its wheel diameter (d) times pi ($\pi$). This results in the following table:

| Wheel Diameter d (inches) | RPM | Off-Set Distance 23 (inches) | Edge Height h in inches |
|---|---|---|---|
| 13.5 | 120 | 2 | 1 |
| 22 | 73.6 | 3.2 | 1.6 |
| 48 | 33.8 | 7 | 3.6 |
| 72 | 22.5 | 10.7 | 5.3 |

Typically of these results, the 22 inch diameter operated at 73.6 RPM with 3.2 inch offset and a 1.6 inch edge height, would handle the daily 8,000 to 10,000 pounds of flue dust that a copper smelter would realize from each collection bin.

None of these specific test results, scaled up data, or described uses should be used to limit the extent and scope of our invention which is to be measured only by the claims that follow:

We claim:

1. A fine particle powder agglomerator comprising:
   a smooth surface generally horizontal disc having a center and a raised outer peripheral edge extending totally around thereof;
   power means for rotating said disc at a substantially constant edge speed;
   means capable of continuously supplying particles with a diameter of no more than 0.01 of an inch near the center of said rotating disc;
   a discharge hopper located generally under said disc;
   means for spraying a binder on said particles as they are supplied to said rotating disc to aid in agglomerating them; and
   means located near said supply for causing the deposited particles to assume an outwardly increasing sloping configuration from the disc's center to its raised edge.

2. The agglomerator of claim 1 wherein said means for causing particles to assume a sloping configuration has two outwardly sloping edges with respect to said disc surface and is attached to said supply means, the highest point on said edge of the sloping configuration means being less than the peripheral edge of said disc.

3. The agglomerator of claim 1 wherein said disc is circular in shape and the raised edge of said disc is less than one-tenth the diameter of said disc.

4. The agglomerator of claim 1 including means for adjusting the rate particles are supplied by said supplying means.

* * * * *